(12) United States Patent
Müller

(10) Patent No.: US 6,769,672 B2

(45) Date of Patent: Aug. 3, 2004

(54) TWO-PHASE DISTRIBUTION APPARATUS AND PROCESS

(75) Inventor: Morten Müller, Fredensborg (DK)

(73) Assignee: UOP LLC, Des Plaines, IL (US)

( * ) Notice: Subject to any disclaimer, the term of this patent is extended or adjusted under 35 U.S.C. 154(b) by 63 days.

(21) Appl. No.: 10/267,136

(22) Filed: Oct. 8, 2002

(65) Prior Publication Data

US 2004/0065966 A1 Apr. 8, 2004

(51) Int. Cl.[7] .................................................. B01F 3/04
(52) U.S. Cl. ...................... 261/114.2; 261/97; 261/110
(58) Field of Search ........................ 261/97, 110, 114.1, 261/114.2, 114.5; 202/158; 203/71

(56) References Cited

U.S. PATENT DOCUMENTS

| | | | | |
|---|---|---|---|---|
| 2,120,256 A | * | 6/1938 | Mensing ...................... 261/128 |
| 2,522,425 A | * | 9/1950 | Baumann et al. ......... 261/114.2 |
| 2,531,030 A | * | 11/1950 | Craft ........................ 261/114.2 |
| 3,824,080 A | | 7/1974 | Smith et al. ............... 23/288 R |
| 3,824,081 A | | 7/1974 | Smith et al. ............... 23/288 R |
| 4,140,625 A | | 2/1979 | Jensen ......................... 208/146 |
| 5,158,714 A | | 10/1992 | Shih et al. ..................... 261/96 |
| 5,232,283 A | | 8/1993 | Goebel et al. ............... 366/336 |
| 5,690,896 A | | 11/1997 | Stangeland et al. ......... 422/191 |
| 5,837,208 A | | 11/1998 | Grott et al. .................. 422/195 |
| 5,942,162 A | | 8/1999 | Gamborg et al. .............. 261/96 |
| 6,183,702 B1 | | 2/2001 | Nguyen et al. .............. 422/194 |

* cited by examiner

*Primary Examiner*—Scott Bushey
(74) *Attorney, Agent, or Firm*—John G. Tolomei; Frank S. Molinaro; David J. Piasecki (57) ABSTRACT

Vapor and liquid passing downward through a vessel are brought into contact within a plurality of distributor assemblies arranged across a horizontal distribution tray located within the vessel. The distributor assemblies have fluid flow paths with different resistances to fluid flow, as by having vapor inlets of at least two different sizes, with the differently sized inlets being located on different assemblies or on different upflow channels of the same assembly. This provides different vapor flow rates and liquid flow rates in different upflow channels. The invention improves the uniformity of liquid distribution over the cross section of the vessel despite elevational differences in liquid levels on the distribution tray or changes in the vapor and or liquid flow rates through the reactor.

20 Claims, 7 Drawing Sheets

TWO-PHASE DISTRIBUTION APPARATUS AND PROCESS

BACKGROUND OF THE INVENTION

1. Field of the Invention

The invention relates to a distribution and mixing apparatus and process for use within a two-phase downflow vessel. The invention specifically relates to an apparatus and process for distributing liquid passing downwardly through a mixed phase reactor containing solid catalyst. The invention more specifically relates to an apparatus used as part of a reactant distribution and mixing device used above or between catalyst beds in a hydroprocessing reactor as in a hydrotreating or hydrocracking process.

2. Related Art

U.S. Pat. No. 5,942,162 illustrates a liquid-vapor distribution device for use in downflow reactors. The devices are fitted over holes in a tray, which extends across the internal cross-section of a reactor. The devices force vapor to travel through a vertical slot leading to an upflow tube 3 which delivers the liquid and vapor to the inlet of a downflow tube 1. The downflow tube 1 extends through the holes in the tray.

U.S. Pat. Nos. 3,824,080 and 3,824,081 illustrate an interbed mixing device comprising an assembly for admixing downward flowing liquid phase hydrocarbonaceous compounds with a hydrogen rich gas stream. These references employ several mixing devices placed at an intermediate elevation in the vertical reactor. These devices include a centrally located main mixing device 16. Located below device 16 is a distributor tray 22 having a plurality of distributor caps 24. These caps comprise a cylindrical cap-like member 25 having V-shaped notches to allow the entrance of fluids. Vapor and liquid can enter the cap through the V-shaped notch and then flow through an opening to catalyst beds located below the distributor tray. Distributor caps are evenly distributed across the distribution tray.

U.S. Pat. No. 4,140,625 illustrates a different form of distributor tray comprising a plurality of caps 12 allowing vapor to flow upward into a cap and then downward through a venturi-shaped lower section having a liquid inlet.

U.S. Pat. No. 5,232,283 illustrates a three-layer mixing system used for admixing liquid and vapor in a mid-point of a hydrocracking reactor. This apparatus comprises an intermediate layer comprising a tray having multiple bubble cap assemblies 46. U.S. Pat. No. 5,690,896 illustrates the same sequence of a mixing chamber above a distribution tray having a plurality of bubble cap assemblies across its surface. A further example of this arrangement of a mixer above a distribution tray is provided by U.S. Pat. No. 5,837,208. This reference gives a limited description of the bubble cap assemblies. They comprise a cylindrical inner wall or riser attached to an opening in the distribution tray. A bell-like cap is placed over the cylindrical inner wall but is separated therefrom to define an annular fluid passageway. U.S. Pat. No. 6,183,702 illustrates yet another assembly for installation in the middle of a downflow catalytic reactor. This installation also comprises an upper mixer and a lower distribution tray.

A bubble cap assembly specifically adapted for use in a reactor is provided in U.S. Pat. No. 5,158,714. The assembly comprises a riser covered in part by a cap. The riser is attached over an opening through the deck tray. Like the previous references, the slots or openings in the cap or skirt appear to be uniform in size and shape and uniformly distributed around the base of the cap. This reference describes various mechanical details, such as means to removably attach the bubble cap assembly to the central cylinder, and a dispersion plate located in a lower end of the riser to provide a flow restriction for the two fluid phases to produce a mist which impacts the catalyst below. The cap is supported by extensions 116 attached to the top end of the central cylindrical wall. The slots 137 in the skirt or cylindrical wall 136 of the cap 114 provide a higher liquid level within the annular space defined by the cap 114 and the riser 112 than on the distribution tray 30. The higher liquid level in the annular space is stated to offset any irregularities in liquid level on the distribution tray 30 and insure a substantially uniform gas-liquid flow through each cap assembly, and substantially uniform mixing of gas and liquid.

Others have employed two phase downflow distributors having uniform flow paths on a tray wherein each flow path has the same configuration and is intended to deliver the same flow rate of liquid. The gas flow is also intended to be equally divided among all the distributors. As exemplified above, various designs for the uniform flow paths of the distributors have been suggested. Uniform flow path distributor designs may provide reasonably even distribution of the liquid over the cross sectional area of the vessel below the tray under ideal conditions. Ideal conditions include for example, a level tray with each distributor installed at the same height and operated with the same depth of liquid around each distributor at design vapor and liquid flow rates to the tray. However, when conditions are not ideal, such as is always the case during commercial operations, maldistribution increases. That is, the liquid is less uniformly distributed over the cross sectional area of the vessel below the tray.

Various uniform flow path designs have different operating ranges or rangeability regarding, for example, the range of vapor and/or liquid flow rates over which the particular design is effective. However, when uniformly configured fluid flow path distributors are subject to different liquid levels on the tray, the paths taken by the vapor and liquid through the various distributors are no longer uniform. For example, liquid at a lower level around one distributor must travel a greater distance before entering its downcomer. Under such conditions, each of the uniform flow path distributors does not deliver the same flow rates of vapor and liquid as intended. Therefore, maldistribution of the liquid across the cross sectional area of the vessel below the tray increases.

As described in the previously cited references, two phase downflow distribution devices are frequently used in hydroprocessing, especially hydrocracking and hydrotreating reactors. The following provides a few examples of non-ideal conditions to which such distribution devices are exposed during commercial operations of such reactors.

It is very important to the performance of a reactor that uniform (plug flow) temperature and reactant flow rate profiles are maintained through a catalyst bed. The temperature and flow rate profiles can interact since a maldistribution of either the vapor or the liquid can result in a change in the temperature profile and vice versa. This is highly critical to the successful long term operation of a reactor, such as a hydrocracking reactor in a petroleum refinery where it is desired to run with a single load of catalyst for an extended period of time. Hydrocracking and other hydrogenation reactions, such as hydrodesulfurization, are very exothermic and the performance of the desired reaction thus raises the temperature of the downward flowing reactants. Further, the activity and selectivity of the catalyst is dependent upon the temperature at which it is operated. The exothermic nature of the reaction, therefore, has an effect upon the performance of the catalyst and the overall process. Maldistribution and inadequate mixing can cause localized temperature excursions which lead to differences in catalyst activity and conversion across the cross section of the reactor. This can lead to a reduced selectivity, reduced average conversion or rate of reaction such that it may be necessary to operate the reactor at more severe conditions or to restrict the flow rate of the feed to the reactor in order to meet a desired level of product quality or conversion without exceeding maximum operating temperatures. This will normally reduce overall process selectivity toward desired products, which lowers the economic benefit of the process.

Another detrimental effect of maldistribution of the reactants and localized temperature excursions is a premature decrease in catalyst life caused by increased deactivation of the catalyst. This may be through use of the catalyst at a high temperature or by the deposition of foulants, such as carbon (coke), on the catalyst surface. In any event, it can lead to premature decrease in the average activity of the catalyst in the reactor and a necessity to prematurely shut down the reactor. Poor product quality, lower than optimum operating capacity, and a premature shut down of the reactor all have significant negative economic effects on the operation of a petroleum refinery. The shut down, reloading and restarting of a hydroprocessing reactor is a complicated and time consuming operation which removes both the subject unit and associated upstream or downstream units from operation. This may potentially reduce the throughput of the entire refinery. It is, therefore, an object of the subject invention to provide an improved apparatus for admixing vapor and liquid and distributing liquid in downward flowing reactors employed to perform hydrocarbon conversion reactions.

Several factors in addition to installation variations, such as an out of level liquid collection tray, may lead to uneven liquid levels on the liquid collection tray of a distributor. One of the problems faced in designing reactor internals in a hydroprocessing reactor are the forces generated by the flowing gas and liquid present in the reactors. These forces coupled with high pressures and temperatures tends to result in great stress on the supports and other apparatus within the reactor. Normally, the forces are absorbed by support beams located in the mixing and distribution equipment. However, there may still be some deflection of internal supports and distribution trays. A much more troubling problem occurs when the descending liquid is fed onto the collection tray at only a few points. This establishes liquid height gradients and liquid flows across the tray. The impact of the descending liquid also causes liquid level disturbances and irregularities. The devices employed on the distribution trays, therefore, need to accommodate these conditions. It is a further object of the subject invention to provide a distribution apparatus which is better able to compensate for differences in the liquid depth surrounding the individual distributors located on different parts of a distribution tray.

The vapor and liquid flow rates through a hydroprocessing reactor will often change over time due to changes in the reactor operating temperature or other operating conditions, changes in the composition of the feed, changes in product specifications or the use of a different catalyst. For instance, an increase in conversion in a hydrocracking reactor leads to increased vaporization of hydrocarbons as the products are more volatile. It is therefore a further object to provide a distribution apparatus, which is very tolerant of changes in the flow rate of vapor and/or liquid, especially increases in the vapor flow rate in the reactor.

The operation of a hydroprocessing unit will vary with time due to differences in feed rates, recycle gas rates, and reactor conditions, e.g. temperature increases to counteract catalyst deactivation. Operating variations such as changes in the liquid flow rate to the tray may cause the level of liquid retained on the collection tray to change. It is a further object of the invention to provide a device which is less sensitive to changes in the liquid level on the collection tray.

BRIEF SUMMARY OF THE INVENTION

The invention is a liquid distribution apparatus for use as part within a two-phase downflow vessel, with the apparatus being less sensitive to local differences in liquid elevation or liquid gradients on the collection tray. The apparatus comprises a plurality of individual distribution assemblies mounted on a horizontal flow-obstructing tray. Each distribution assembly comprises an overlying cap or shroud which helps define one or more individual flow channels each having the shape of an inverted U. The fluid flow path begins at passageways in a vertical side wall of the cap providing communication with the flow channel. When two or more flow channels are present in a single distributor assembly, the fluid flow paths may merge in the assembly above the tray. The apparatus has at least two differently configured fluid flow paths such as by having differences in the configuration of passageways to provide different fluid flow rates through the differently configured fluid flow paths of the apparatus. The mass flux of vapor and/or the mass flux of liquid will vary between different assemblies or between the two or more flow paths of a single distribution assembly having multiple flow channels. This improves distribution of the liquid downward to the next level despite irregularities caused by non-uniform construction, liquid level gradients and/or by an unlevel distribution tray. In an embodiment the subject invention features a distinctive structure of the downcomer, which may be circular, rectangular or triangular, and a distinctive structure of the passageways of the overlying cap.

The total structure of any specific fluid flow path sets the resistance to fluid flow, and hence the flow rates of the gas and the liquid through the fluid flow path. Thus, there must be at least two fluid flow paths in the apparatus that differ in configuration such as by size, shape, inlet restriction, outlet restriction, intermediate restrictions, or combinations thereof.

DETAILED DESCRIPTION

The subject invention finds utility in various mixed phase, that is, having both vapor and liquid phases, vessels having downward flow of both phases. The invention may be readily utilized for example to provide mixing and/or redistribution of the vapor and liquid phases in vessels containing a fixed bed of particles such as catalyst and/or adsorbent. A particularly beneficial application of the invention is in hydroprocessing reactors such as used in hydrocracking and hydrotreating as for desulfurization of petroleum derived hydrocarbon fractions. The subject distributor assemblies admix the liquid and vapor phases and then distribute the resulting mixed phase stream across the cross section of the reactor. This helps eliminate reactant concentration profiles and radial temperature gradients in the catalyst bed. Such profiles and/or gradients may form due to a tendency of liquid or vapor to channel within the reactor. For instance, in a hydrocracking or hydrotreating reactor, interbed remixing ensures that all of the descending liquid has been brought into contact with the hydrogen rich gas phase and thus all the liquid has reached thermal equilibrium. The primary function of the apparatus is liquid distribution across the top of the catalyst bed, but the assemblies help in admixing the vapor and liquid to a uniform temperature, with this function being especially important at intermediate points in the reactor where a quench or a new feed stream is admixed with the fluids flowing downward through the reactor. For clarity and convenience, reference is made herein primarily to an application of the invention in hydroprocessing reactors. Such use however should not be construed as a limitation of the present invention.

In general, the basic structure of the apparatus forces liquid, collected on a horizontal tray, to flow upwardly through enclosed fluid flow channels into the top of numerous vertical downcomers spread across the tray in a uniform pattern. The liquid then falls through the downcomers to a volume of the vessel below the tray, thus completing the downward leg of the flow path through the distributor assemblies. The flow of liquid through the enclosed channel is accompanied by the vapor flow, with the vapor tending to lift the liquid into the downcomer.

In an embodiment, the subject invention comprises an apparatus, which resembles a bubble cap assembly but has a novel design of the portion of the apparatus which allows passage of vapor through the overlying cap or shroud and into the upflow channel. The apparatus also features a novel design of the internal structure of the upflow channels and inlet of the downcomer through which the mixed vapor and liquid descend to below the distribution tray.

One basic characteristic of the overall apparatus is that there are a plurality of differently configured fluid flow paths which provide different flow rates of gas and liquid. In an embodiment, some upflow channels will have high vapor mass flux and low liquid mass flux while other upflow channels will have low vapor mass flux and high liquid mass flux. This can be brought about in several different ways, such as by providing differently sized passageways for the flow of gas into the different upflow channels. These passageways are in the outer wall of the upflow channel and are the only point at which vapor is intended to flow into the channel. That is, it is not desired that a significant amount of vapor flows under the lower edge of the cap. The passageways are sized to restrict vapor flow into the channel of the distributor and thus provide the primary resistance to the vapor flow. The liquid flow rate is primarily governed by the resistance to the mixed phase fluid flow created by the structure of the fluid flow path between the passageway and the open vessel volume below the tray. Thus, the shape, dimensions, and location of the passageway, the cross-sectional size and shape of the upflow channel, the length of the channel, the relative height of the top of the upflow channel, the roughness of the surfaces in contact with the fluid, and the presence of restrictions in the fluid flow path including inside the downcomer all help define the resistance of the overall flow path to the flow of fluids. When these variables are combined with the other parts of the apparatus which can be varied, there is an almost infinite number of possible designs for the subject apparatus.

Assuming other factors remain unchanged, allowing easier passage of vapor into a flow channel has two effects. First, it reduces the pressure differential between the volume outside the distributor and the volume within the upflow channel. This in turn allows the liquid level within the channel to be closer (lower) to the liquid level present on the tray outside the channel. A higher rate of vapor passage therefore makes it necessary to lift the liquid further before it can flow into the downcomer. The result is a reduced liquid flow into the downcomer. That is, an increase in the available passageway area will result in higher vapor flow rate but lower liquid flow rate in the channel and vice versa.

As the vapor flow through the passage carries the liquid upward, this type of device is referred to as vapor-driven. In the present case, with the differently configured fluid flow paths and resulting differences in vapor and liquid flow rates, the devices may be referred to as Asymmetrical Vapor Driven (AVD) distributors.

The rather simple structure of the flow path where vapor first pass through a passageway, then flow upwards with liquid in a vertical flow channel, over an internal weir, and finally flow downward through the downcomer makes possible a wide variety of alternative structures. Selecting the best design is mainly a question of ease and cost of fabrication rather than a question of relative performance. One fundamental variation is that the differently configured fluid flow paths may be in a single distributor having two or more fluid flow channels or they may be in totally different distributors. That is, in an embodiment, the apparatus may comprise a liquid collection tray having a plurality of distributor assemblies, with each assembly having only one vertical fluid flow channel, but with the vapor passageway into the channels of different assemblies having one of two or more different cross-sectional areas. In an alternative embodiment, the distributor assemblies have two or more vertical flow channels, each having a corresponding vapor passageway with the passageways of the same assembly having different available areas. As used herein, the term cross-sectional area of the passageway relates to the total available open area of the slot(s), perforation(s) or opening(s) of any shape in the vertical side wall of the shroud or cap, which in part forms a part of the upflow channel. The passageway may be in the form of multiple slots or openings which do not need to be of the same size, shape, or elevation. The open area is also limited in that liquid may cover some of the passageway. This will block some vapor flow. As used herein, the term vertical relates to the feature having at least some vertical component, that is perpendicular to the horizontal liquid collection tray. For example, it is only required that vertical flow channels have some vertical component, that is they are not parallel to the tray.

In an embodiment, the subject apparatus continues the practice of having the bottom of the overlying cap stop short of the top surface of the tray to allow a sizeable opening. This opening, e.g. 2–7 cm high, is intended to be below the normal level of liquid on the tray and thus normally sealed to gas flow. It does, however, function to permit fluid flow at above normal flow rates in case of a significant operational upset or other unplanned event. This is especially important if the liquid collection tray is well sealed against fluid bypass.

The tray, which collects downwardly flowing liquid preferably extends across all of the available cross section of the reactor. It may be in the form of connected parts or sections to accommodate other reactor internals. The tray is preferably designed and fabricated to provide a tight seal to the reactor inside wall to avoid leakage of liquid resulting in liquid maldistribution. This will also force vapor to flow through the passageways and internal channels of the distributor assemblies. Low capacity drain holes through the apparatus may be provided. The distribution tray and the rest of the overall reactor internals may be of conventional design.

Alternative structures of the distributor assembly are shown in the drawing figures. The figures are presented only to characterize the invention and alternatives. They are not intended to limit the scope of the concepts disclosed herein or to serve as working drawings. They should also not be construed as setting limits on the scope of the inventive concept. The relative dimensions shown by the drawing should not be considered equal or proportional to commercial embodiments.

Figure 1:
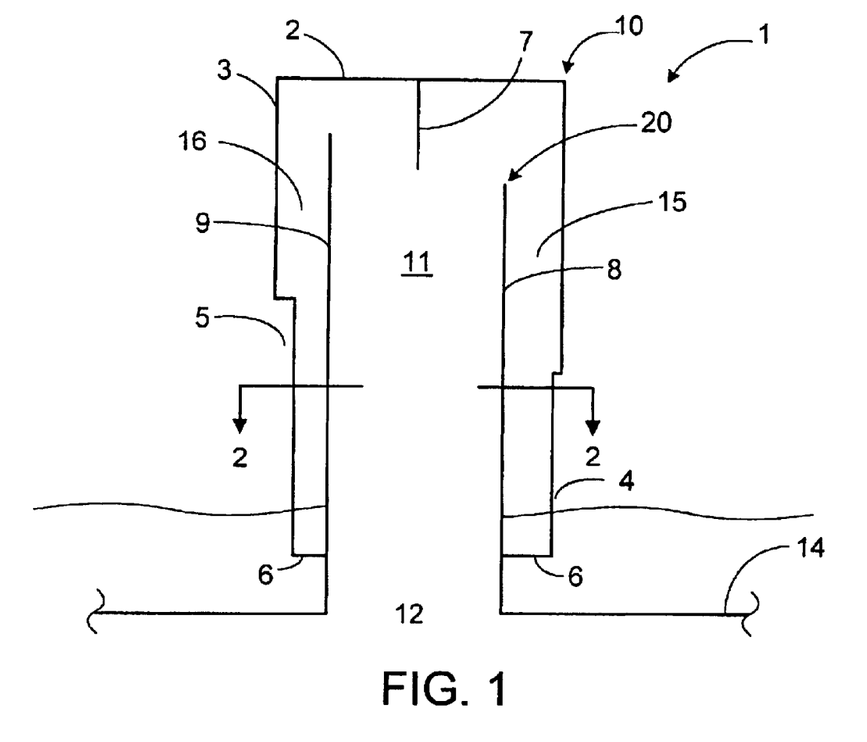
FIG. 1 is a side sectional view through a dual flow channel distributor assembly of the present invention.

Referring now to the drawings, FIG. 1 shows a sectional side view as seen looking horizontally at a distributor 1 having two flow channels. A cap or shroud 10 fits on top of a downcomer or riser 20 that is centrally located within the cap 10. The downcomer 20 in turn is mounted over an opening 12 in a tray 14 which collects the descending liquid. The downcomer 20 may pass through the hole 12 to extend below the tray not shown. In an embodiment, all of the gas and liquid flowing downward through the reactor flows through the numerous, e.g. 20–2200, distributors constructed in this manner on a tray.

Figure 2:
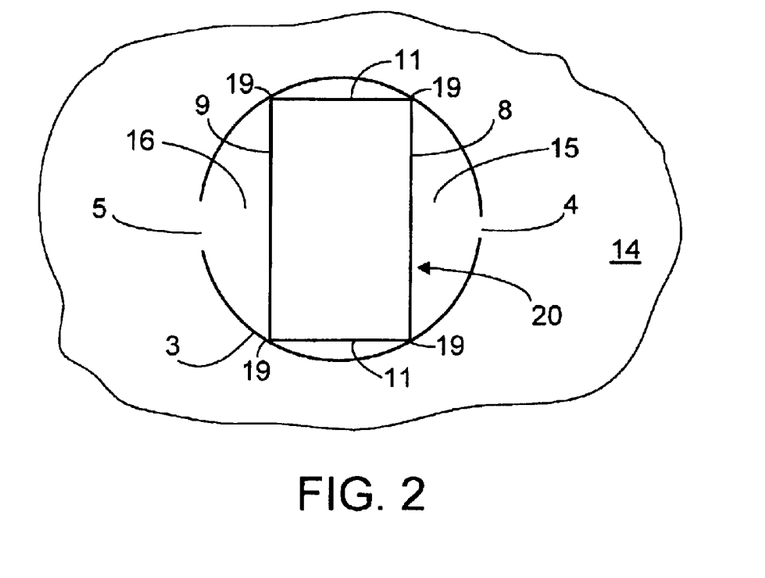
FIG. 2 is an overhead sectional view taken along the segment 2—2 of FIG. 1.

FIG. 2 is an overhead view taken along the segment 2—2 of FIG. 1 showing the arrangement of the downcomer 20 within the cap 10. FIGS. 1–2 illustrate the arrangement of the cap 10 and downcomer 20 to define the overall configuration of the distributor 1 in this embodiment.

Figure 3A:
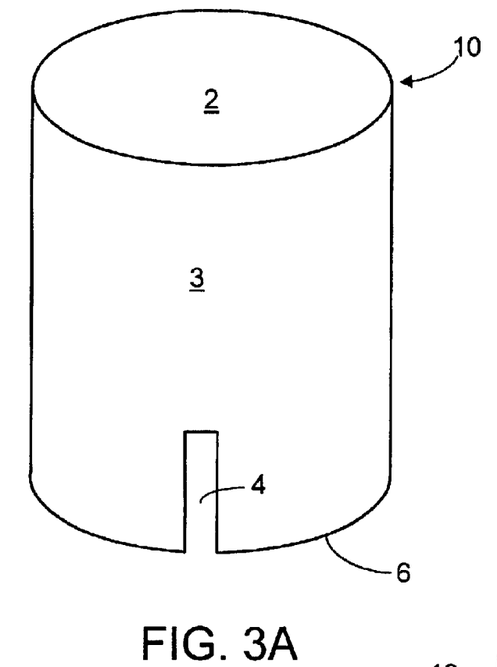
FIGS. 3A and 3B show views looking towards opposite sides of a cap according to the distributor of FIG. 1.
Figure 3B:
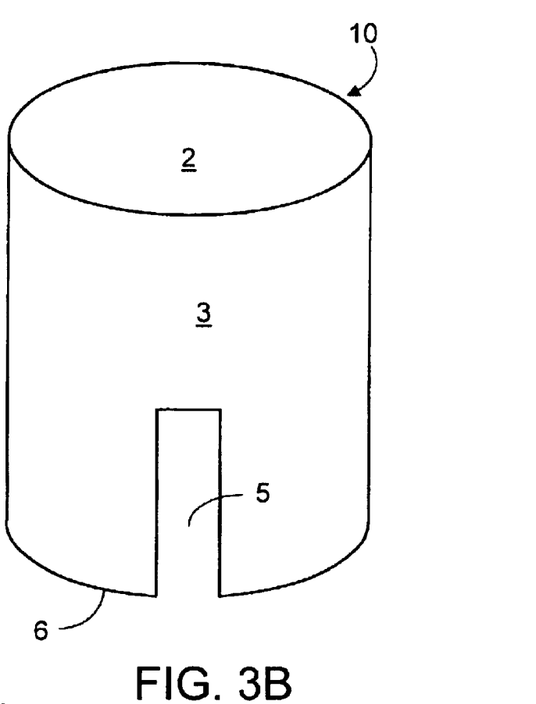
Figure 4:
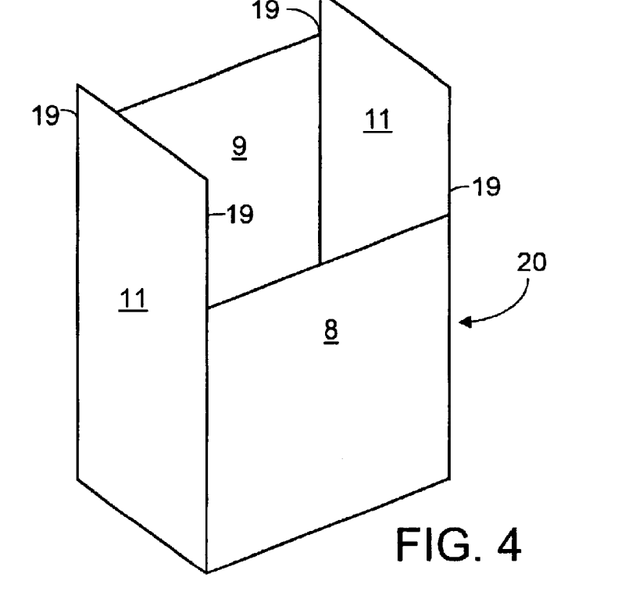
FIG. 4 is an isometric view of a downcomer according to the distributor of FIG. 1.

FIGS. 3–4 respectively illustrate the configuration of the cap 10 and downcomer 20 of the distributor of FIG. 1. FIGS. 3A and 3B show views looking towards opposite sides of a cylindrical side wall or skirt 3 of a cap 10 having passageways 4 and 5, respectively according to the dual flow channel distributor of FIG. 1. The cylindrical wall 3 and the top plate 2 form a cap or shroud 10 which covers the open upper end of a downcomer to form the distributor 1. The cap 10 is preferably substantially imperforate except for any means used for attachment in order to maintain the relative position of the cap and for the passageways 4 and 5 designed for the passage of vapor and liquid. In an embodiment not shown, either or both of the passageways 4 and may comprise a plurality of openings. The passageways are not the same. For instance, in the embodiment of FIGS. 1–4 there is the smaller, low vapor flow slot 4 and in the opposite side of the cap 10, there is a larger, high vapor flow rate passageway 5. The high vapor flow rate passageway 5 is preferably both taller and wider than the opening provided by the low vapor flow rate passageway 4. Preferably they are on opposite sides of the side wall 3. The cap may be rounded on the top if desired.

FIG. 4 is a view of a downcomer according to the dual flow channel distributor of FIG. 1. This downcomer 20 comprises two face walls 8, 9 and two end walls 11. The end walls 11 are substantially identical and reach to the same elevation. The upper edges of the end walls abut the inside surface of the top plate 2 to support the cap 10 above the downcomer 20. All four of these walls extend from the upper portion of the distributor assembly down to the level of the tray 14. A lower portion of all four of these walls is preferably sealed to the horizontal tray 14 in a fluid tight seal. The two face walls 8, 9 are both shorter than the end walls 11. Face wall 9 reaches to a higher elevation than face wall 8. The downcomer 20 may be more rectangular with the end walls 11 being relatively narrow compared to the view shown in this figure. It is not required that the downcomer have a regular geometric shape, for example, the face and end walls may be skewed at various angles and/or the walls may be curved.

As illustrated in FIGS. 1–2, the face walls 8, 9 of the downcomer are located opposite specific passageways 4, 5 in the side wall 3 of the cap 10 and define two vertical (upflow) channels or fluid receiving chambers 15, 16. The smaller, low vapor flow rate passageway 4 is located opposite the shorter face wall 8 and provides fluid communication with a first vertical (upflow) channel 15. The larger, high vapor flow rate passageway 5 is located opposite the taller face wall 9 and provides fluid communication with a second vertical (upflow) channel 16. The vertical (upflow) channels or fluid receiving chambers 15, 16 are located within the vertical volume of the cap 10 between the face walls 8, 9 of the downcomer and the cylindrical side wall 3 of the cap.

Vapor and liquid enter these channels and flow upward to the inlet to the downcomer. FIG. 2 shows the vertical edges 19 of the downcomer end walls 11 touching the inner surface of the cylindrical side wall 3 of the cap 10. These vertical edges 19 are unitary with the vertical corners of the downcomer 20. If the cap 10 is to be removable, any gap at this point is preferably the minimum needed to ensure easy installation and removal of the cap. It is preferred that the vertical edges 19 of the downcomer end walls 11 abut the inner surface of the side wall 3 to prevent fluid flow from one receiving chamber to the other. That is, fluid should not be able to go around the downcomer but rather is forced upward to the downcomer inlet. Attachment of the vertical edges 19 of the downcomer end walls 11 to the inside of the cylindrical side wall 3 will promote the desired difference in resistance to fluid flows between the two flow channels 15, 16. However, it is not required that the cap be attached to the downcomer.

As shown in FIG. 1, the side wall 3 of the non-symmetrical cap 1 extends downwards from the top plate 2 to a bottom edge 6 a short distance above the horizontal upper surface of the tray 14. Thus, liquid present on the tray 14 enters the distributor through the bottom of the cap and flows into the upflow channels 15, 16 between the side wall 3 and the face walls 8, 9. Liquid may also enter the channels through the passageways 4, 5. The liquid is pulled upwardly through the channels 15, 16 by vapor entering through the passageways 4 and 5. It is intended that the bottom edge 6 of the cap will be submerged in the liquid on the tray 14. The mixture of vapor and liquid will flow upwardly towards the top of the assembly and flow over the top edges of the face walls 8, 9 into the downcomer 20. It is noted that the vertical edges of end wall 11 have been omitted from FIG. 1 to clarify this flow path of the liquid over the top edges of the face walls into the downcomer.

The downcomer 20 defines a portion of the fluid flow path and is formed in part by opposing face walls 8 and 9. The top edge of the face wall 9 is located at a higher elevation than the top edge of the face wall 8. This higher elevation requires the liquid to be lifted further in vertical upflow channel 16 than in channel 15. The smaller opening above face wall 9 to the downcomer compared to the larger opening above face wall 8 creates additional resistance to liquid flow in channel 16 relative to upflow channel 15. Vertical upflow channel 16 has less resistance to vapor flow relative to vertical channel 15 since vapor enters through the larger passageway 5. Thus, vertical upflow channel 16 may be referred to as the high vapor flow/low liquid flow channel and vertical upflow channel 15 may be referred to as the low vapor flow/high liquid flow channel.

The two mixed phase streams flowing over the respective top edges of the downcomer face walls enter into the open top of the downcomer. As they enter the downcomer 20 they are preferably kept separate for a short time by a vertical flow dividing baffle 7 located in the top portion of the assembly. This baffle 7 is in an embodiment an imperforate wall centered within the downcomer and which extends downward at least below the upper edge of the taller wall 9. The baffle 7 may terminate in a lower edge at an elevation intermediate the top edges of face walls 8 and 9. The baffle 7 may extend below the upper edge of the shorter wall 8. The baffle may also be said to form two downcomers if it extends to the bottom of the downcomer 20. Thus, there may be multiple downcomers within one assembly leading to a single perforation through the tray. One assembly may also be constructed with multiple downcomers leading to multiple perforations through the tray. This vertical dividing baffle is, however, optional. It is intended to prevent fluid entering one side of the downcomer from interfering with the flow on the other side of the downcomer. Its use effectively changes the configuration of at least one fluid flow path and will naturally change the resistance to flow. The two mixed phase streams will merge below the dividing baffle 7 and flow downwardly through the downcomer to the opening 12 in the distribution tray 10. The mixture will then fall downwardly toward the catalyst below the tray. In an embodiment of the invention, distribution assemblies of the same configuration having two or more differently configured flow paths that merge in a single downcomer above the tray may be used. In such a case, the difference in resistance to flow and the resulting difference in fluid flow rates must be determined at a point just before the fluid flow paths meet. After this junction, such as below the baffle 7 or the tray, the combined flow from the multiple fluid flow paths will be the same for each assembly.

Figure 5:
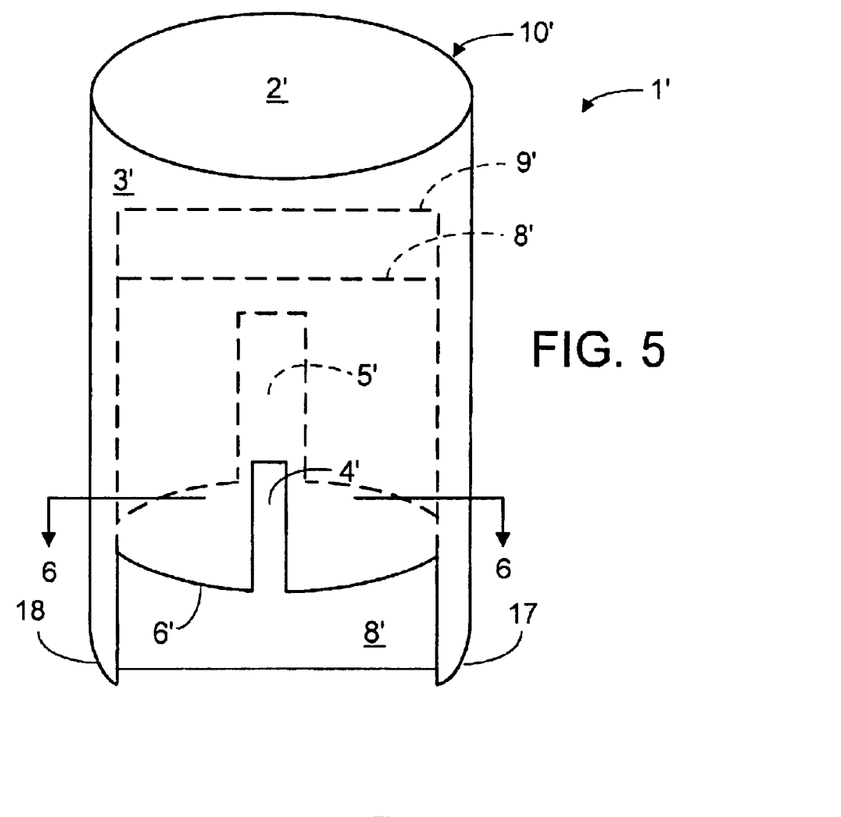
FIG. 5 shows an isometric view of an alternative distributor assembly.
Figure 6:
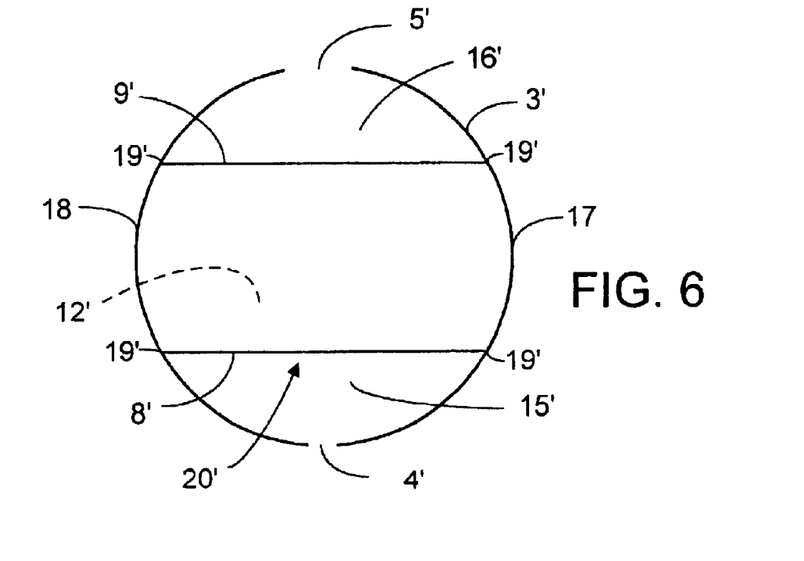
FIG. 6 is an overhead sectional view taken along the segment 6—6 of FIG. 5.

Another embodiment of a dual channel distributor assembly according to the invention is shown in FIGS. 5–6. Elements in FIGS. 5–6 that differ in configuration from their corresponding element in FIGS. 1–4 will be designated by attaching a prime symbol "'" to the reference numeral. FIG. 5 shows a view looking towards a cap 10' of distributor assembly 1'. FIG. 6 is an overhead sectional view taken along the segment 6—6 of FIG. 5 showing the arrangement of the downcomer 20' within the cap 10'. In this embodiment, the downcomer is formed by two face walls 8', 9' and two arcuate portions 17, 18 of the cylindrical side wall 3' between the face walls 8', 9' which extend down to the upper surface of the tray not shown. The two remaining portions of the side wall 3' which are opposite the face walls 8', 9' and define the vertical channels or receiving chambers 15', 16' extend down only to the bottom edge 6' of the side wall 3'. Again, this bottom edge 6' is located a short distance above the upper surface of the tray, and is submerged in the liquid collected on the tray during use. Lower portions of the face walls 8', 9' and arcuate portions 17, 18 of the side wall 3' are preferably sealed to the horizontal tray in a fluid tight seal.

The face walls 8', 9' extend substantially across the internal volume of the cap 10' such that they form chords extending across the circle circumscribed by the side wall 3' of the cap as shown in FIG. 6. The relative heights of the face walls and the configuration of the large passageway 5' are shown by phantom lines in FIG. 5. As shown, the shorter face wall 8' and taller face wall 9' of the downcomer 20' are again specifically arranged with the differently configured passageways 4' and 5' to define the high vapor/low liquid vertical flow channel 16' and the low vapor/high liquid vertical upflow channel 15'. The flow paths of vapor and liquids through the distributor 1' are analogous to those previously described. The vertical side edges 19' of the face walls 8', 9' are preferably close enough to the internal surface of the side wall 3' of the cap 10' such that fluid flow is restricted. Preferably the vertical side edge 19' of the face wall at least abuts the cap to prevent vapor flow. That is, fluid entering the cap via either passageway 4' or 5' cannot easily flow from one vertical channel to the other. Attachment of the side edge 19' of the face walls 8', 9' to the inside of the cylindrical side wall 3' will promote the desired difference in resistance to fluid flows between the two flow channels 15', 16'.

The downcomer arrangement of FIGS. 5–6 suggests an adaptable structure in that the face walls 8', 9' may be easily positioned at different distances from their corresponding passageways to define upflow channels with different vertical cross sectional areas and therefore different resistances to fluid flow. That is the downcomer 20' need not be centrally located with the cap 10'. A similar arrangement can be envisioned with for example a downcomer having a trapezoidal cross sectional shape. Further differences in the configuration of the two flow paths may be easily accomplished with use of the optional vertical flow dividing baffle inside the downcomer.

Figure 7:
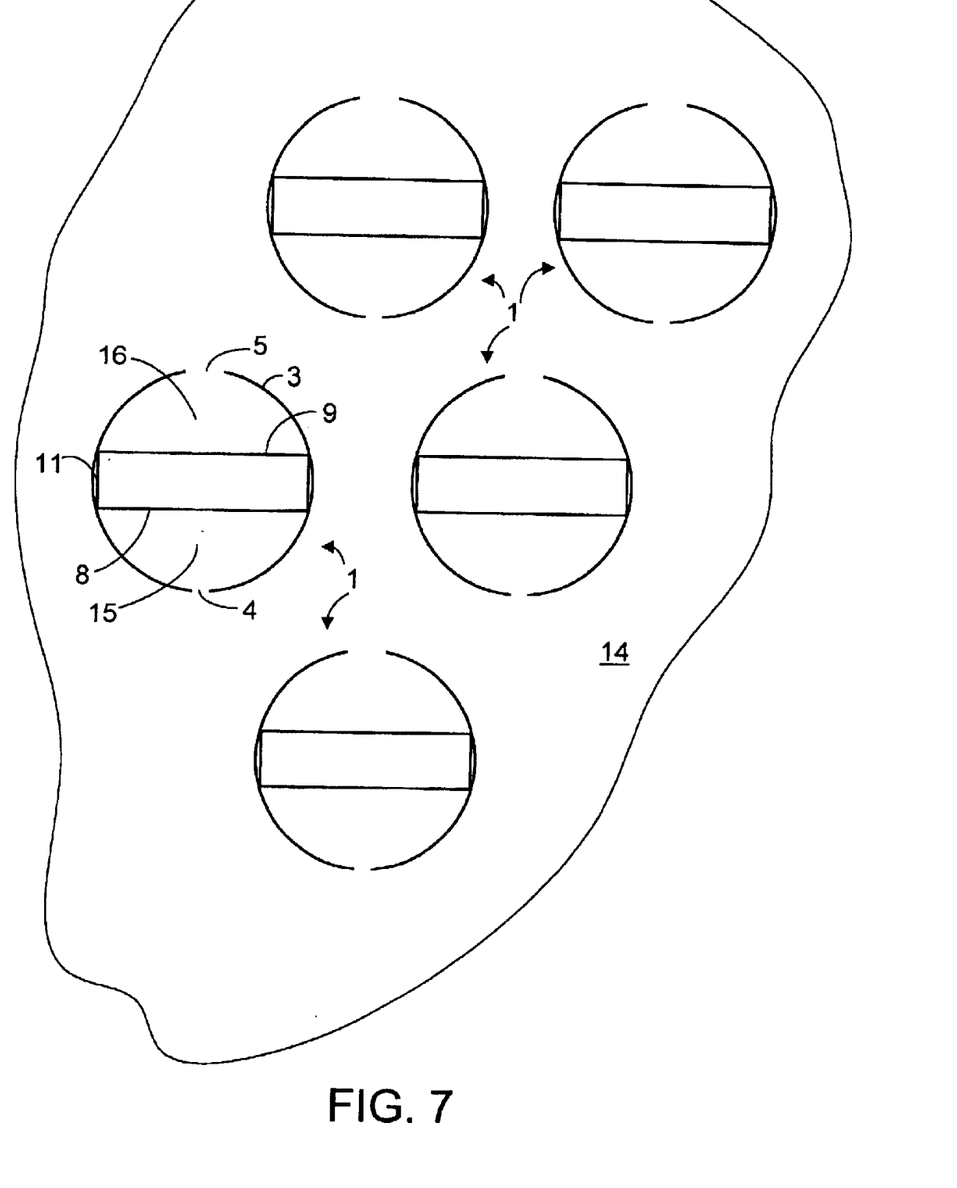
FIG. 7 is a simplified sectional view from above illustrating five distribution cap assemblies located in a triangular grid pattern on a distribution tray.

FIG. 7 is an overhead view providing a sectionlike view of five dual channel distributor assemblies 1 spaced apart on a portion of a tray 14. An actual tray employed in a reactor would have a large number of assemblies evenly distributed across the area of the tray 14. The number of assemblies could be from between 20 to 2200 or more depending on the size of the distribution tray and the assemblies. This drawing is illustrative of downcomers having a more rectangular shape with the end walls 11 being relatively narrow compared to the opposing face walls 8 and 9.

Figures 8A, 8B, 8C:
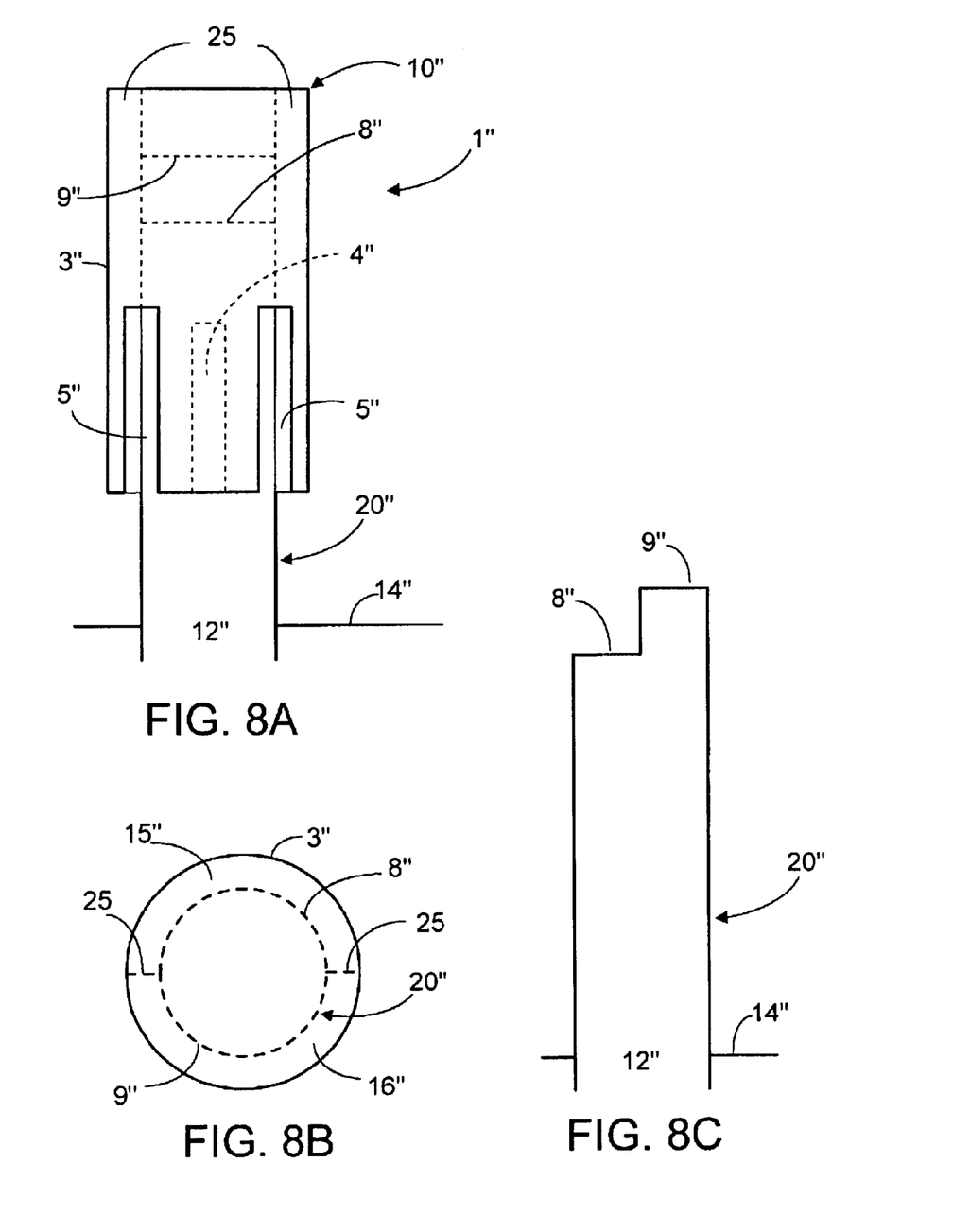
FIG. 8A is a side view of a dual channel distributor assembly having a cylindrical downcomer with a stepped inlet at the top of the downcomer.
FIG. 8B is an overhead view of the dual channel distributor assembly of FIG. 8A.
FIG. 8C is a side view of only the downcomer of FIG. 8A showing the stepped inlet. The view is rotated 90° from that of FIG. 8A.

FIG. 8A is a side view of a dual flow channel distributor 1" having a cylindrical downcomer 20" and cylindrical cap 10". Elements in FIGS. 8A, 8B, and 8C that differ in configuration from their corresponding element in FIGS. 1–6 will be designated by attaching a double prime symbol """ to the reference numeral. Two vertical slots 5" on the front half of the cap 10" form a larger vapor flow passageway leading to a first flow channel 16" within the distributor 1". One vertical slot 4", shown in phantom, located on the backside of the cap 10" forms the smaller passageway leading to a second flow channel 15" of the distributor. This arrangement can be more easily discerned by reference to FIG. 8B, which is an overhead view of the mixer-distributor. This view shows the two semi-cylindrical portions 8" and 9" of the downcomer 20" partially defining the vertical flow channels 15" and 16", which each occupy one half of the annulus between the downcomer 20" and the overlying cap 10". The two flow channels 15" and 16" are isolated from one another by vertical spacing walls 25 as shown in FIGS. 8A and 8B. These spacing walls may extend above the downcomer to support the cap 10" above the top edge of the higher downcomer face wall 9" as shown in FIG. 8A.

FIG. 8C illustrates only the cylindrical downcomer wall 20" of the distributor and a portion of the tray 14" shown in FIG. 8A. This horizontal side view shows the downcomer of FIG. 8A as rotated 90 degrees. This allows a better depiction of the stepped inlet at the top of the downcomer. A first semi-cylindrical portion 9" of the downcomer 20" extends to a greater height than the second semi-cylindrical portion 8" of the downcomer 20". The upper edges of these semi-cylindrical portions form the inlet weirs to the downcomer 20" at the top of the vertical flow channels 15" and 16". This is equivalent to the upper edges of the two planar face walls 9 and 8 in previously described embodiments. A vertical baffle, not shown, can be used to isolate the two flow channels at the downcomer inlet as before.

The distributor arrangement of FIGS. 8A–8C provides a particularly adaptable structure for providing more than two upflow channels in a single distributor assembly. It is only necessary to add another vertical spacing wall 25 to divide the annulus into three channels. Four spacing walls 25 provide four channels. An equivalent number of vapor passageways are provided in the cylindrical side wall 3", each corresponding to a separate channel. A similar division can be achieved with downcomers having planar sides such as by having a triangular downcomer or a square downcomer. A triangular downcomer is well suited for a cap having a cylindrical side wall, and a square downcomer is well suited to be used with either cylindrical or square side wall caps. A square downcomer can be aligned with face walls parallel to the side walls of the square cap, or rotated by 45 degrees such that the corners of the downcomer are centered against the midpoints of the enclosing square side walls. Vertical spacing walls and vertical baffles can still be used.

Figure 9A:
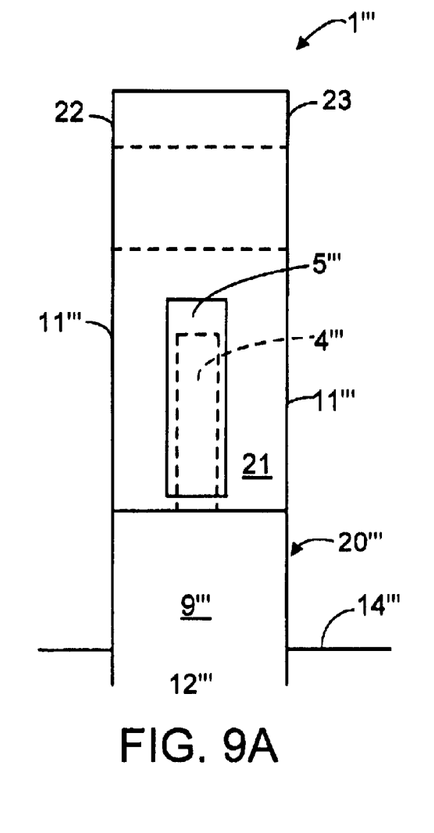
FIG. 9A is a front side view of a different form of a dual channel distributor assembly mounted on a tray.
Figure 9B:
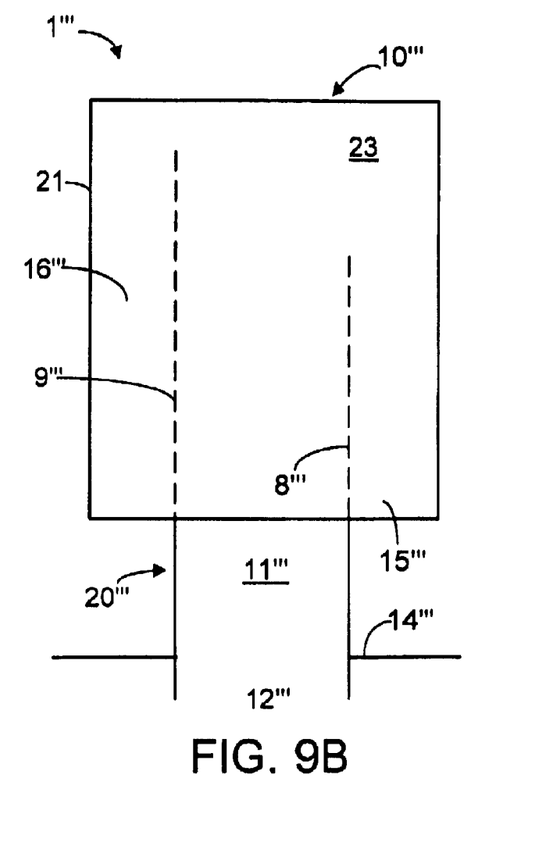
FIG. 9B is a side view of the distributor assembly of FIG. 9A.
Figure 9C:
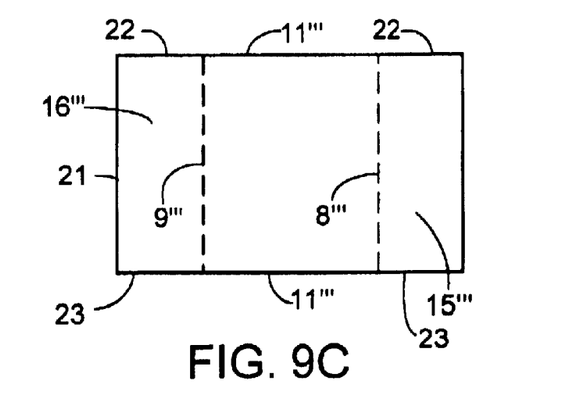
FIG. 9C is an overhead view of the distributor assembly of FIG. 9A.

FIGS. 9A–9C illustrate a dual upflow channel distributor having a different structure. Elements in FIGS. 9A, 9B, and 9C that differ in configuration from their corresponding element in FIGS. 1–8 will be designated by attaching a triple prime symbol """" to the reference numeral. The overlying cap of previous structures is replaced by two extensions overhanging opposing sides of a rectangular downcomer 20'". This can also be considered as two rectangular caps or a single cap having a central portion in common with the upper portion of the downcomer end walls 11'". FIG. 9A is the view seen looking horizontally toward a vertical front wall 21 of a cap 10'" having a high vapor flow passageway 5'". This passageway is completely surrounded by the front wall of the distributor rather than the passageway being a slot rising from the bottom edge of the wall. The position of the low vapor flow rate passageway 4'" on the back of the structure is shown in phantom. It is noted that whether a passageway intersects the bottom edge of the cap such as passageway 4, or the bottom edge of a passageway is a distance above the bottom edge of the cap such as passageway 5 is yet another difference in the configuration that may be used in any embodiment of the invention. FIG. 9B shows a side (profile) view of the same distributor and allows appreciation of the arrangement of the opposing tall face wall 9'" and shorter face wall 8'" of the downcomer 20'" shown in phantom. The end walls 11'" of the downcomer 20'" are unitary with side wall portions 22 and 23 of the cap 10'" which also define the outer sides of the flow channels 15'" and 16'". FIG. 9C is an overhead view of the same distributor. A similar distributor can be easily visualized if the side wall portions 22 and 23 of the cap 10'" are slightly wider apart so that a complete rectangular cap is made to fit over the downcomer 20'". That is the inside of the side walls 22 and 23 abut the outside of the downcomer end walls 11'".

Figure 10A:
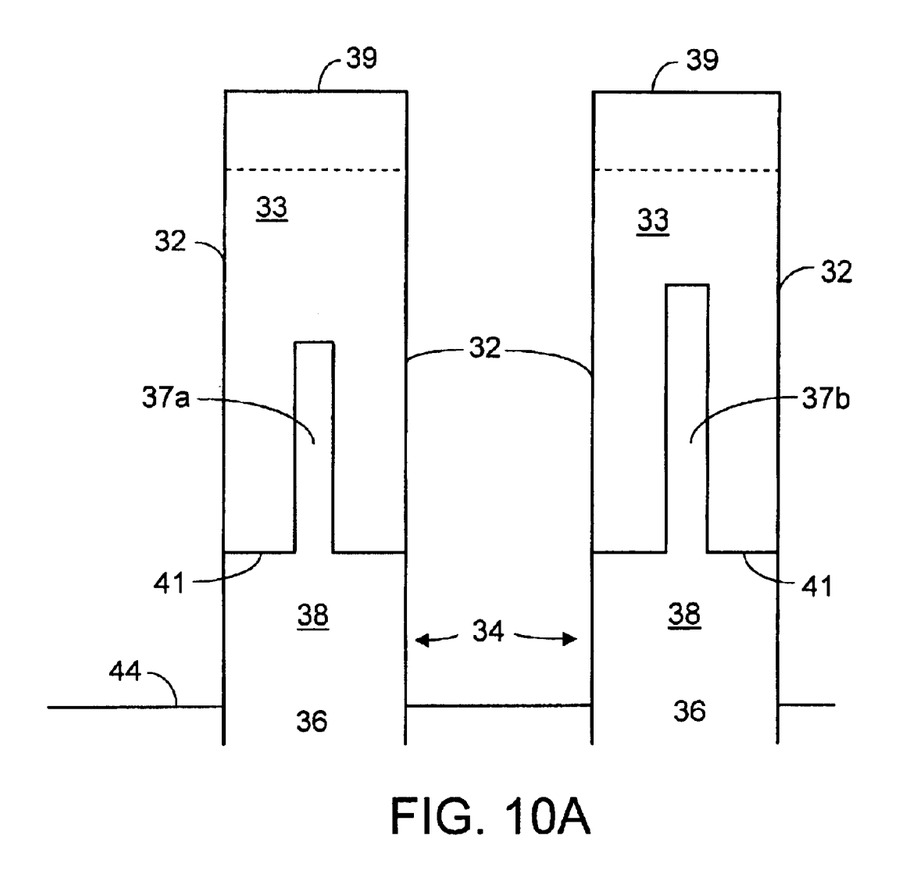
FIG. 10A is a horizontal front view of two distributor assemblies having differently sized vapor inlet passageways on a tray.
Figure 10B:
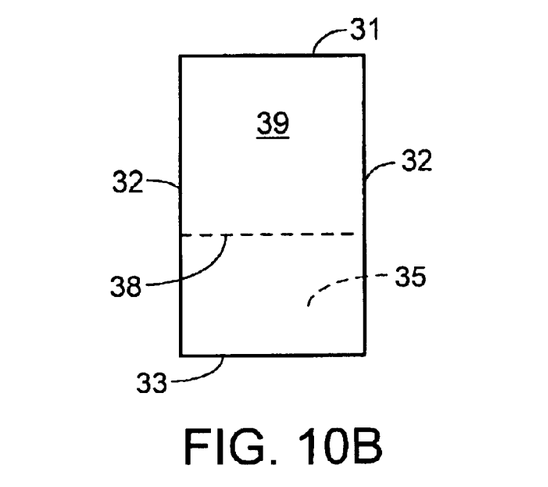
FIG. 10B is an overhead view of one of the single flow channel distributors assemblies of FIG. 10A.

FIG. 10A is a front view of a portion of horizontal liquid collection tray which has two non-identically configured distributor assemblies mounted on it. FIG. 10B is an overhead view of one of the distribution assemblies of FIG. 10A. Each distributor assembly comprises a rectangular downcomer 34 mounted in a hole 36 in the liquid collection tray. The downcomer 34 is formed from two side walls 32, a back wall 31 and an inlet wall 38. Similarly to the structure of FIGS. 9A–9C, a portion of the downcomer side walls 32 above the upper surface of the collection tray extends laterally to a front wall 33 and downwardly from the top plate 39 to define an upflow channel 35. The inlet wall 38 of the downcomer is shorter than the other walls and thus does not touch the top plate 39. This provides the weir or opening into the top of the downcomer 34 at the top of the upflow channel 35 through which the vapor and liquid pass into the downcomer 34. A single vapor passageway 37a located in the rectangular front wall 33 is employed as there is only one upflow channel 35 in each of these assemblies. As before, this passageway, may comprise multiple openings. In this view, the wall 33 is in front of inlet wall 38 and has a bottom edge 41 which is normally below the liquid level on the tray.

This figure illustrates two distributor assemblies in which only the size, that is the cross sectional area, of the passageways 37a and 37b differ to provide at least two differently configured fluid flow paths that deliver different flow rates of vapor and liquid through the same tray. In an embodiment not shown, the passageways 37a and 37b have the same cross sectional area, but they are configured differently such as by one of the passageways having a greater height and smaller width than the other. In another embodiment not shown, both the size and shape of the passageways 37a and 37b are the same, but they are configured differently such as by being positioned at different heights relative to the tray. In yet another embodiment, the configuration of the passageways is the same and a single difference in the configuration of the flow path after the passageways is sufficient to distinguish the fluid flow paths. For example, a difference in the height of the inlet walls 38, or a different restriction in the upflow channels 35, or inside the downcomer 34 between two fluid flow paths may be used to provide the different configuration. As noted earlier, these examples of differences in the fluid flow path configuration, like the others illustrated and described herein may be used in any embodiment of the invention. Thus, a single difference in the fluid flow path may be sufficient to provide the different resistance to fluid flow and different flow rates of vapor and liquid between the non-identically configured fluid flow paths of the apparatus which may be in the same or separate distributor assemblies. As before, multiple changes in the configurations of the entire flow path may be used in the distributor assemblies to provide at least two flow paths of the apparatus with different resistances to fluid flow that deliver different rates of vapor and liquid.

As the difference in the two assemblies of FIG. 10A is only in the area of the passageways 37a and 37b in the vertical wall 33, the assemblies will appear identical in the view shown in FIG. 10B. This view is useful in discerning the essentially square cross-section of the downcomer 34 and the nature of the overhanging upflow channel 35. It is again noted that none of the walls comprising the vertical flow channels or the downcomer need be perpendicular to the tray. They have some vertical component and may be inclined from vertical by the same or different angles.

The design of a single channel distributor easily accommodates differences in the shape of the downcomer or cap. For instance, a round cap or shroud can be fitted over a downcomer which is round, square, triangular or has any other suitable cross-section. It is also noted that regardless of the cross-sectional shapes of a downcomer and a cap, a cap need not be centered over a downcomer. The vertical axis of a downcomer can be located nearer an edge of a cap. Also, portions of one or more walls of the downcomer may abut or be coplanar with or be unitary with one or more side walls of a cap or shroud.

The deployment of at least two differently configured sets of distributors such as a first set having upflow channels with high vapor flux, and at least a second set for example having low vapor flux introduces several other alternative arrangements and optional overall structures. First, the relative fraction of mono-channel distributors having upflow channels with a certain size vapor passageway, such as the high vapor flow passageways, can be set to any desired amount. There is no requirement that, for instance, one-half of the passageways are either high or low vapor flow passageways. For instance, only one-quarter of the distributors may have the larger high vapor flow passageways. Alternatively, only one-quarter of the single channel distributors could have upflow channels with smaller (low vapor flow) passageways. The remainder of the distributors would have the larger high vapor flow passageways. It is further noted that the passageway size distribution can be across three or more sizes; that is, passageways may be large, small and intermediate. Similar variations may be made in the remainder of the flow path beyond the passageway, instead of and/or in combination with the variations in the passageways, to obtain the desired number of sets of differently configured mono-channel distributors. The distribution of differently configured fluid flow paths within multi-channel distributors may likewise be varied. Yet another variation is the placement of both single channel and multi-channel distributors on the same tray. Also, there may be different sets of multi-channel distributors deployed across a tray, with or without one or more sets of single channel distributors. As used herein, the term "set" describes distributor assemblies that have the same structure; e.g., they can be considered as substantial copies of each other. A set may comprise as few as a single distributor on the tray or as many as all of the distributor assemblies on the tray. There is no requirement that a set of multi-channel assemblies have differently configured fluid flow paths provided there is at least one other set of distributors having at least one differently configured fluid flow path on the tray. Thus, the invention encompasses the myriad variations possible in the configuration of the flow paths that can be combined with various sets of single and/or multi-channel distributor assemblies.

For example, an apparatus according to the invention may include a first set comprising many, single channel distributors having a flow path of a first configuration and a second set comprising one distributor assembly that provides a flow path of a second configuration. In another example, an apparatus according to the invention may include a set of single channel distributors having a first configuration, a first set of multi-channel distributors having two equivalent fluid flow paths of a second configuration, a second set of multi-channel distributors having two fluid flow paths in which at least one of the fluid flow paths is different from that of the first set, and a third set of multichannel distributors having three fluid flow paths in which one, two, or all three of the fluid flow paths are configured differently. In an embodiment, a first set of multi-channel distributor assemblies has uniform flow paths of a first configuration, and a second set of multi-channel assemblies has uniform flow paths of a second configuration on the tray.

A suitable cylindrical cap can be formed from a piece of standard pipe having a diameter of about 5–16 centimeters (2 to 6 inches) with a total height of about 12–25 centimeters (5 to 10 inches). In an embodiment, the distance between the top edge of the tallest downcomer wall and the inner surface of the top of the cap should be at least 7 millimeters. The distance between the top inside surface of the cap and the top edge of a second downcomer wall is at least 8 millimeters greater.

It is preferred that both the height and the cross sectional area of the high flow rate and low flow rate vapor passageways of the cap differ by at least 10%. As used herein, values of differences between corresponding features in two flow paths of the apparatus are calculated as a percentage with respect to the smaller of the two values being compared. In an embodiment, the width of the large capacity vapor passageway is at least 10% greater than the width of the small capacity vapor passageway. In other embodiments, the width of the large capacity vapor passageway is equal to or less than the width of the small capacity vapor passageway while the relative heights of the two passageways are adjusted accordingly so that the cross sectional area of the large capacity vapor passageway is at least a 10% greater than the cross sectional area of the small capacity vapor passageway. In an embodiment, there are at least two passageways in the apparatus having open cross sectional areas which differ by at least 10%. In another embodiment, there are at least two passageways in the apparatus having open cross sectional areas which differ by at least 25%. It is again noted that it is within the scope of the invention that the open area of the passageways in the side wall of the cap can be provided by more than one opening. For instance, a single slot passageway can be provided to communicate with a first upflow channel and two taller slots provided to communicate with a second upflow channel. If a greater number of openings is provided for the higher vapor flow passageway, then these openings may have the same or lesser width than the openings provided for the low vapor flow passageway. The openings for a single vapor passageway may differ, e.g. both a slot and a round opening can be employed as a single passageway. For applications where the required open area of the vapor passageway is low, one or more vertical rows of spaced apart circular openings may typically be used rather than slots. When multiple rows of openings are used, each may have a different number of openings. There is no requirement to align multiple openings or rows of openings of a passageway, for example multiple rows of openings may be vertically staggered relative to each other.

As mentioned above, the flow rates of vapor and of liquid through a channel are set by the resistances to fluid flow, that is vapor and liquid flows, presented by the entire flow path from the vessel volume above the liquid collection tray just external to the distributor assemblies to the vessel volume under the downcomer outlets just below the tray. Since all the fluid flow paths represent parallel systems in communication with the same volumes, the total pressure drop is the same through each of them and is equal to the pressure drop across the tray. However, as previously described, different portions of the fluid flow path may be used to set the primary resistances to one of the fluids, such as the area of the passageways providing the primary resistance to vapor flow. Thus, in an embodiment there are at least two differently configured fluid flow paths in the apparatus wherein the resistance to at least one of the flow of vapor and the flow of liquid differs. Changing the relative area of the vapor passageways in different fluid flow paths is only one embodiment for varying this design variable. The size of the passageways could be equal if the other portions of the structure of the fluid flow path; e.g., the weir heights of the face walls between the upflow channel and downcomer, provide sufficient differences.

Naturally, more than one portion of the flow path may differ to provide the different configurations and resistances to fluid flow desired. One way to convey this is by characterizing the apparatus as providing distributor assemblies having at least two fluid flow paths each having a characterizing ratio $A_p/A_c$ where $A_p$ is the area of the openings of a passageway leading to an upflow channel, and $A_c$ is the minimum available flow area through the remainder of the path to below the tray. In an embodiment, the ratio $A_p/A_c$ differs by at least 10 percent for two fluid flow paths. In another embodiment, the ratio $A_p/A_c$ differs by at least 20 percent for two fluid flow paths. Areas are measured on the basis of the minimum available cross sectional area for fluid flow.

These differences in configurations and resistances to fluid flow thus result in different flow rates of vapor and/or liquid through the differently configured fluid flow paths of the apparatus. In an embodiment, both the vapor and liquid flow rates differ between differently configured fluid flow paths of the apparatus. In an embodiment at least one of the vapor flow rate and liquid flow rate differ by at least 10% between differently configured fluid flow paths. In another embodiment at least one of the vapor flow rate and liquid flow rate differ by at least 25% between differently configured fluid flow paths.

The relative differences between corresponding features in two flow paths of the apparatus may vary significantly according to the specific application of the invention. For example, the specific features which are different between flow paths through the apparatus, the number of differently configured sets of flow paths used, and the operating parameters or process conditions for which the apparatus is designed may influence the relative differences in the corresponding features.

Thus, in an embodiment of the invention, the difference between the open cross sectional areas of at least two passageways in the apparatus may vary from about 25% to about 400% for different process conditions.

In an embodiment of the invention, the difference between the ratio $A_p/A_c$ of at least two flow paths in the apparatus may vary from about 50% to about 550% for different process conditions.

In an embodiment of the invention, the difference between the liquid flow rates through at least two flow paths of the apparatus may vary from about 30% to about 8200% for different process conditions.

What is claimed:

1. An apparatus for evenly distributing downwardly flowing liquid across a cross-sectional area of a vessel in which the downward flow of vapor and the liquid is obstructed by a horizontal tray which forces the vapor and liquid to flow through spaced apart openings through the tray wherein the spaced apart openings through the tray are capped by distributors which force the vapor to follow a flow path through a passageway in a wall of the distributor, through a flow channel located within the distributor, and through the openings, wherein at least two flow paths are differently configured and provide different resistances to at least one of the flow of vapor and the flow of liquid.

2. The apparatus of claim 1 wherein the flow channels have minimum cross-sectional areas available for flow, $A_c$, such that the ratio $A_p/A_c$, where $A_p$ is the available cross-sectional area of the passageway corresponding to the flow channel, has at least two different values in the apparatus.

3. The apparatus of claim 2 wherein the ratio $A_p/A_c$ differs by at least 10 percent between at least two flow paths of the apparatus.

4. The apparatus of claim 1 wherein the cross sectional areas of at least two passageways differ by at least 10 percent.

5. An apparatus for admixing vapor and liquid flowing downwardly through a vessel and distributing the liquid evenly over a cross-sectional area of the vessel below the apparatus, the apparatus comprises a plurality of assemblies mounted on a horizontal tray, an assembly comprising:

a downcomer having an open upper first end and an open lower second end in fluid communication with a volume of the vessel below the tray, the downcomer being affixed to the horizontal tray; and a shroud overlying the first end of the downcomer, the shroud comprising a substantially closed top portion and a side wall, the shroud having a passageway located in the side wall and communicating with a fluid flow channel located between the side wall and the downcomer, the fluid flow channel also communicating with the first end of the downcomer to define a fluid flow path through the passageway to the volume of the vessel below the tray, wherein at least two fluid flow paths of the apparatus have different configurations and provide different flow rates of at least one of the vapor and the liquid.

6. The apparatus of claim 5 wherein the flow rate of at least one of the vapor and the liquid differs by at least 10 percent between at least two fluid flow paths of the apparatus.

7. The apparatus of claim 5 wherein the differently configured fluid flow paths being provided by separate assemblies.

8. The apparatus of claim 5 wherein the differently configured fluid flow paths being provided within one assembly.

9. An apparatus for distributing vapor and liquid flowing downwardly through a vessel, the apparatus comprising:

a liquid collection tray being mounted horizontally in the vessel and having a plurality of holes;

downcomers having an open upper end and an open lower end being in communication with the holes; and, a cap overlying each downcomer and comprising a substantially sealed top portion and a side wall, the side wall defining a first and a second isolated vertical flow channel, each flow channel communicating with the upper end of the downcomer, the side wall having at least a first passageway providing fluid communication with the first flow channel and a second passageway providing fluid communication with the second flow channel, the first passageway having a cross-sectional area at least 10 percent greater than the cross-sectional area of the second passageway.

10. The apparatus of claim 9 wherein the first passageway is wider than the second passageway.

11. The apparatus of claim 9 wherein a vertical baffle extends downward from the cap into an upper end of the downcomer.

12. The apparatus of claim 9 wherein the first passageway being at least two separate openings in the side wall of the cap.

13. The apparatus of claim 9 wherein the first passageway has an upper edge located closer to the top portion of the cap than an upper edge of the second passageway.

14. The apparatus of claim 9 wherein the downcomer comprises a first face wall defining a portion of the first isolated vertical flow channel and a second face wall defining a portion of the second isolated vertical flow channel, the first face wall having a greater height above the liquid collection tray than the second face wall.

15. The apparatus of claim 14 wherein the downcomer further comprises two end walls of substantially equal size and shape, the two end walls having a greater height above the liquid collection tray than the first face wall of the downcomer, the end walls having upper edges which abut the top portion of the cap.

16. The apparatus of claim 15 wherein the face walls are parallel to each other and perpendicular to the end walls forming a rectangular downcomer having vertical corners.

17. The apparatus of claim 16 wherein the side wall of the cap has a cylindrical shape, and an inner surface abutting the vertical corners of the downcomer defines the first and second vertical flow channels in conjunction with the first and second face walls, respectively.

18. A process for providing uniform distribution of liquid across the cross-sectional area of a downflow vessel below a liquid collecting tray, the process comprising:

collecting vapor and liquid in the vessel above the liquid collecting tray, the tray having a plurality of distributors comprising a downcomer and a shroud and providing fluid communication through the tray;

passing at least a first portion of the vapor through a first passageway in the shroud and into a first flow channel within the distributor;

passing at least a second portion of the vapor through a second passageway in the shroud and into a second flow channel within the distributor;

mixing liquid on the liquid collecting tray with vapor in the first and second flow channels thereby forming vapor/liquid mixtures; and passing the vapor/liquid mixtures in the flow channels through the downcomer to a volume of the vessel volume below the tray, wherein at least one pair of the first and second passageways and the first and second flow channels being configured differently.

19. The process of claim 18 wherein the liquid is evenly distributed across a bed of particulate solids below the tray.

20. The process of claim 18 wherein the process is a hydroprocessing process.

* * * * *